P. D. SKAHEN.

BURIAL CASE.

APPLICATION FILED NOV. 7, 1905.

Reissued Jan. 2, 1912.

13,350.

2 SHEETS—SHEET 1.

WITNESSES:

Chas. Jones,

Chas. H. Young.

INVENTOR

Patrick D. Skahen

BY

Hy. Parsons

ATTORNEYS

COLUMBIA PLANOGRAPH CO., WASHINGTON, D. C.

P. D. SKAHEN.

BURIAL CASE.

APPLICATION FILED NOV. 7, 1905.

Reissued Jan. 2, 1912.

13,350.

2 SHEETS—SHEET 2.

WITNESSES:

Chas. J. Foner.

Chas. H. Young.

INVENTOR

Patrick D. Skahen

BY

Key & Parsons

ATTORNEYS

COLUMBIA PLANOGRAPH CO., WASHINGTON, D. C.

UNITED STATES PATENT OFFICE.

PATRICK D. SKAHEN, OF SYRACUSE, NEW YORK.

BURIAL-CASE.

13,350. Specification of Reissued Letters Patent. Reissued Jan. 2, 1912.

Original No. 766,000, dated July 26, 1904, Serial No. 201,806. Application for reissue filed November 7, 1905. Serial No. 286,297.

*To all whom it may concern:*

Be it known that I, PATRICK D. SKAHEN, of Syracuse, in the county of Onondaga, in the State of New York, have invented new and useful Improvements in Burial-Cases, of which the following, taken in connection with the accompanying drawings, is a full, clear, and exact description.

This invention resides in an improved construction of a burial-case which is designed to be used either as a casket or a rough box for inclosing a casket.

The invention has special reference to the class of burial-cases which have their walls, bottom, and lid composed of separate sheet-metal plates.

The objects of the present invention are to produce a knockdown burial-case of the aforesaid character in which the component parts can be quickly and easily assembled in the process of construction, and thus cheapen the cost of manufacture, and at the same time produce a structure which shall possess great strength, rigidity, and durability and shall also present a neat appearance. These objects I attain in a simple and efficient manner of uniting the side walls and end walls and the bottom of said walls by the employment of vertically-grooved corner-posts in which the vertical edges of the walls are keyed and firmly anchored; and the invention consists in the novel details of construction, as hereinafter fully described, and set forth in the claims.

Figure 1:
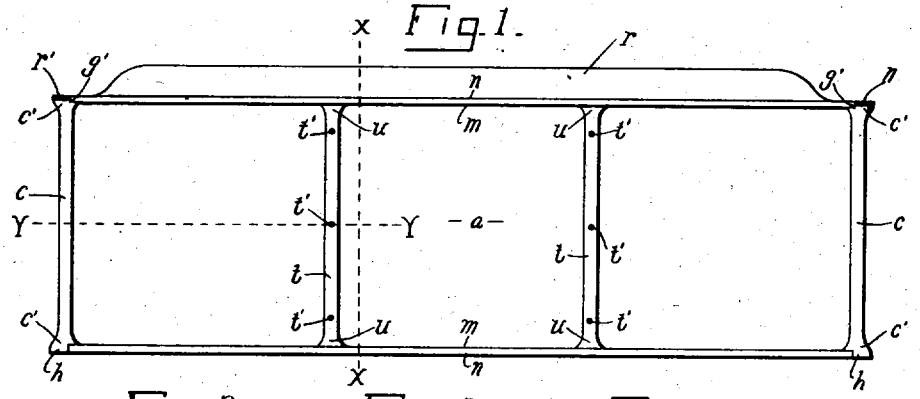
Figure 2:
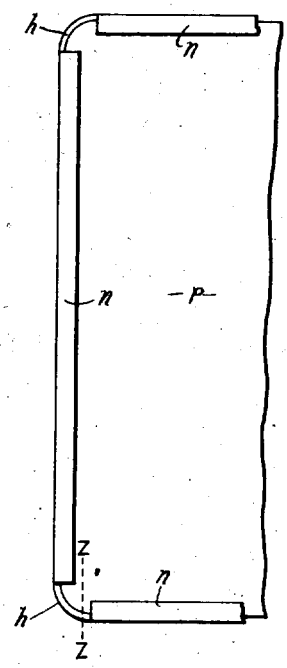
Figure 3:
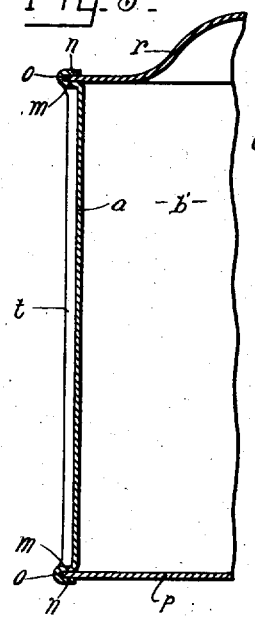
Figure 4:
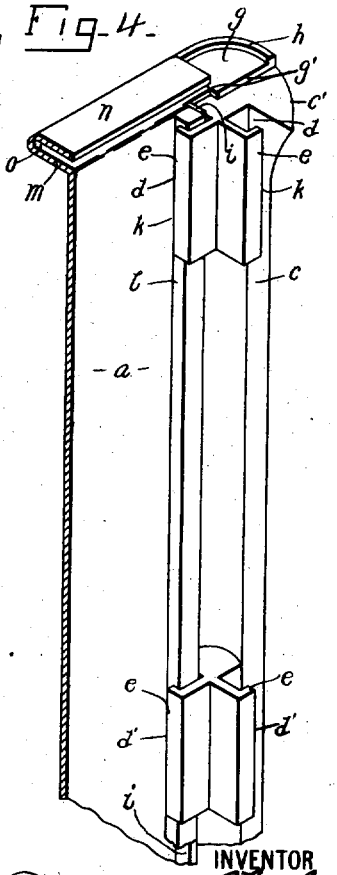
Figure 5:
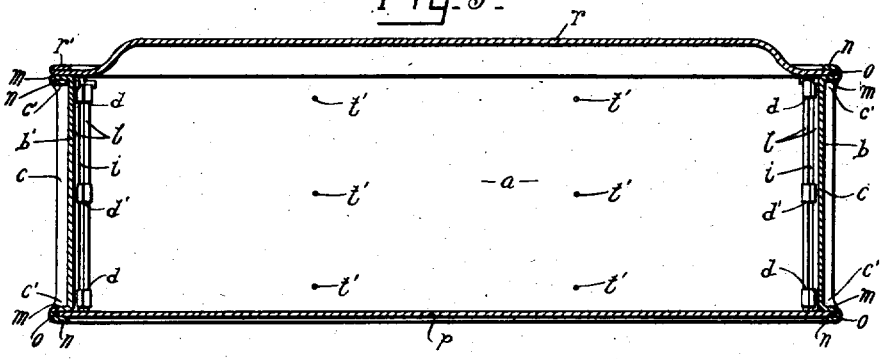
Figure 6:
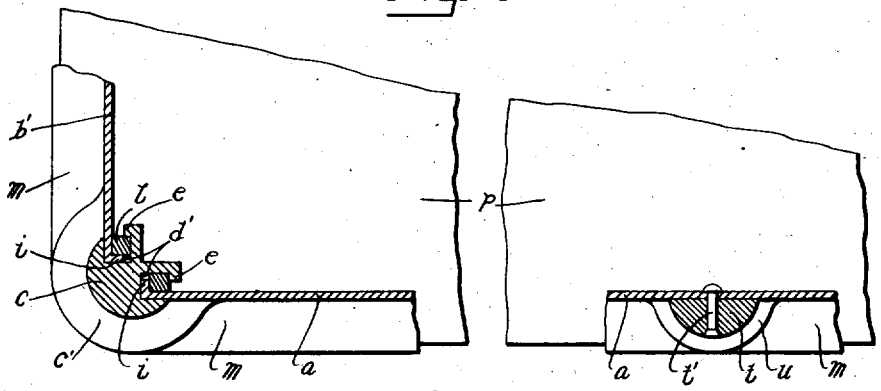
Figure 7:
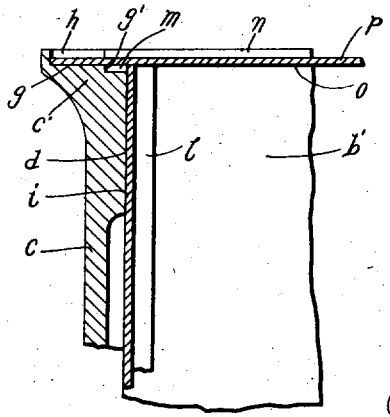

In the accompanying drawings, Figure 1 is a side view of a burial-case embodying my improvements. Fig. 2 is an enlarged bottom plan view of an end portion of the burial-case. Fig. 3 is an enlarged transverse section of a portion of the burial-case, taken on line X X in Fig. 1. Fig. 4 is a further enlarged perspective view of a portion of the corner-post inverted and showing more clearly the attachment of the walls thereto. Fig. 5 is a vertical longitudinal section of the case. Fig. 6 is an enlarged horizontal section of one corner of the case, taken on line Y Y in Fig. 1; and Fig. 7 is an enlarged vertical sectional view taken on the line Z Z in Fig. 2.

Similar letters of reference indicate corresponding parts.

*a a* represent the side walls, and *b b'* the end walls, of the burial-case, which walls are composed of separately-formed sheet-metal plates.

*c c* denote posts which are disposed at the corners of the case and are preferably composed of cast metal and are provided with enlarged end portions, as indicated at *c' c'*. These posts may be of any suitable form and style and are formed in their inner faces, near the top and bottom thereof, with pairs of grooves *d d*, which are disposed vertically and are open in directions at right angles to each other. Said posts *c c* are also formed intermediate their ends with grooves *d' d'*, arranged in pairs and in line with the aforesaid grooves *d d*, as more clearly shown in Fig. 4 of the drawings.

*g g* denote steps which are formed on the end faces of the posts *c c* and are provided with two edges disposed at right angles to each other, as indicated at *g' g'*, and partly surrounding each of the lower steps is a curved rim *h*, formed on the post for the purpose hereinafter explained.

The side walls *a a* and end walls *b b'* have their vertical edges bent inwardly at right angles to form flanges *i i*, which are inserted into the aforesaid grooves *d d d' d'* in the posts and which bear against the rear walls of the grooves. The inner side walls of the said grooves are formed with vertical ribs *e e*, producing contracted side entrances *k k* between said walls and the opposite side walls of the grooves, which entrances are of sufficient width to admit the said flanges *i i*. These ribs *e e* constitute shoulders for the keys *l l*, which are inserted into the grooves, as clearly shown in Figs. 4 and 6 of the drawings. Said keys consist of metal bars formed, preferably, square or rectangular in cross-section and which are driven endwise into the said grooves *d d d' d'* of the posts and caused to engage the flanges *i i* of the walls and the oppositely-disposed ribs *e e* of the grooves, and thereby firmly anchor the flanges therein to lock the walls to the said posts.

The longitudinal edges of the side walls *a a* and one of the end walls are bent outwardly to form ledges *m m*, which terminate with inwardly-folded flanges *n n*, thereby producing inwardly-opening channels *o o* between said ledges and flanges. The ends of said ledges *m m* extend beyond the aforesaid flanges *i i* of the walls and bear on the ends of the posts *c c* and abut against the edges of the aforesaid steps *g g* and are substantially in a plane with the latter, as clearly illustrated in Fig. 4 of the drawings. The lower edge of the end wall *b'* is also formed with an outwardly-projecting ledge *m m*, which terminates with an inwardly-folded flange *n*, bearing on the lower end faces of the posts. The upper edge of said latter wall has its outwardly-projecting ledge *m* terminating with a downwardly and inwardly folded flange *n*, bearing on the top faces of the adjacent posts. This flange is bent in the manner described for the purpose of allowing the lid *r* to be applied to the case, as hereinafter explained.

*p* denotes the bottom of the case and which is composed of sheet metal. Said bottom is inserted with its marginal portions into the lower channels *o o* of the walls and has its corner portions rounded and bearing on the aforesaid steps *g g* and abutting against the curved rims or guards *h h*, which are flush with the lower face of said corner portions.

In assembling the said parts I first unite the two side walls *a a* and the end wall *b* to two of the corner-posts *c c* in the manner described and then apply the bottom *p* by inserting the same endwise into lower channels of the side walls and sliding it forwardly sufficient to cause the front edge thereof to enter the lower channel of said end wall and at the same time cause its rounded corners to abut against the aforesaid curved rims on the end faces of the posts, and then drive the said keys endwise into the grooves in said posts to firmly anchor the flanges in said grooves. The other corner-posts *c c* are then keyed to the corresponding end wall, and these posts are firmly united to the vertical flanges at the rear of the side walls in like manner, whereby the rear edge of the bottom is caused to enter the lower channel of the latter end wall and its rounded corner portions made to abut against the curved rims on the lower faces of the said posts in the manner aforesaid. These rims constitute guards which serve to protect the corner portions of the bottom.

The lid *r*, which is also composed of sheet metal, may be of any suitable form and design. Said lid is applied by inserting the same with its marginal portions lengthwise into the upper channels *o o* of the side walls *a a*, whereby its forward end is caused to enter the upper channel of the corresponding end wall, and its rounded corner portions are caused to lie upon the top steps of the front posts.

I prefer to dispense with the curved rims or guards on the upper end faces of the posts and make the lid sufficiently long to lie with its rounded corner portions contiguous to the curved edges of the posts. I also prefer to fold the rear edge of the lid upon itself to strengthen the same, as indicated at *r'*. It will be understood that the bottom flanges *n n* of the walls are to be firmly clenched onto the marginal portions of the bottom *p*. Any suitable means may be employed for locking the said lid in its closed position on the case, and, if desired, the top flanges of the walls may be clenched onto the lid.

*t t* represent additional posts, which I prefer to employ and which are formed of cast metal and are secured to the outer faces of the side walls *a a* by means of rivets *t' t'*, as more clearly shown in Figs. 1 and 6 of the drawings. These posts serve to stiffen the said side walls, and thus add strength and rigidity to the burial-case, and they are formed with enlarged end portions, as indicated at *u u*, which abut against the aforesaid ledges *m m* of said walls and brace the same.

It is obvious that a separate key may be used at each of the grooved portions *d d'* for fastening the walls to the corner-posts. I prefer, however, to employ keys of sufficient lengths to extend through both the upper and lower grooves *d d* and through the intermediate grooves *d' d'*, so as to cause said keys to bear on the inner sides of the walls from top to bottom thereof and effectually brace said walls and press them outward onto the edges of the posts, so as to closely fit them thereto.

What I claim as my invention is:—

1. In a knockdown burial-case, the combination of the end walls and side walls composed of separate sheet-metal plates and formed at their vertical edges with inwardly-projecting flanges, corner-posts formed with vertical grooves having contracted side entrances and receiving the flanged portions of said walls, and keys inserted endwise in said grooves and engaging said flanges and contracted portions of the grooves and firmly locking the walls in said grooves as set forth.

2. A burial-case comprising sheet-metal side walls and end walls formed at their vertical edges with flanges, corner-posts formed with vertical grooves receiving said flanges and each groove provided with a vertical rib on one of its sides, and keys inserted in said grooves and engaging said flanges and ribs and locking the walls to the posts as set forth and shown.

3. In a burial-case, the combination of corner-posts formed with vertical grooves, the side walls and end walls formed at their vertical edges with flanges entering said grooves and at their lower longitudinal edges with outwardly-projecting ledges bearing on the ends of the posts, keys inserted in said grooves and locking the flanges therein, and the bottom secured to the lower ledges of the walls as set forth and shown.

4. In the burial-case, the combination of corner-posts, each formed at its top and bottom with a pair of vertical grooves and at its intermediate portion with a pair of grooves disposed in line with the end grooves, the side walls and end walls formed at their vertical edges with flanges entering said grooves, and keys inserted in said grooves and engaging said flanges to lock the walls to said posts as set forth and shown.

5. In a burial-case, the combination of metallic corner-posts formed with vertical grooves, sheet-metal side walls and end walls formed with flanges entering said grooves, keys inserted in said grooves and locking the flanges therein, the longitudinal edges of the walls formed with outwardly-projecting ledges bearing on the ends of the posts and terminating with inwardly-folded flanges producing channels, and the bottom and lid inserted in said channels as set forth and shown.

6. In a burial-case, the combination of corner-posts formed with vertical grooves in the inner sides and with steps projecting from the end faces of the posts, the walls formed with vertical flanges locked in said grooves and at their longitudinal edges with outwardly-projecting ledges bearing on the ends of the posts and abutting against said steps and in a plane therewith and terminating with inwardly-folded flanges producing channels, and the lid and bottom inserted in the upper and lower channels respectively as set forth and shown.

7. In a burial-case, the combination of corner-posts formed in the inner sides with vertical grooves, and with steps projecting from their end faces and rims or guards partly surrounding the lower steps, sheet-metal side and end walls formed at their vertical edges with inwardly-projecting flanges entering said grooves, keys inserted in said grooves and locking the said flanges therein, the longitudinal edges of the walls formed with outwardly-projecting ledges bearing on the end faces of the posts and abutting against the aforesaid steps and terminating with inwardly-folded flanges producing inwardly-open channels, the lid removably inserted in the upper channels, and the bottom inserted in the lower channels and having its corner portions abutting against the said rims or guards as set forth and shown.

8. In a burial-case, the combination of corner-posts formed with enlarged end portions and provided in their inner sides with vertical grooves, the side walls and end walls formed at their vertical edges with inwardly-projecting flanges entering said grooves, keys inserted in said grooves and locking the flanges therein, the longitudinal edges of the walls formed with outwardly-projecting ledges extending beyond said flanges and bearing on the end faces of the posts, said ledges terminating with inwardly-folded flanges producing channels, the bottom inserted in the lower channels and locked permanently therein, and the lid seated removably in the upper channels as set forth and shown.

9. A burial case comprising sheet-metal side walls and end walls provided with vertical edge flanges, vertical corner posts having parts coöperating with said flanges for uniting said walls, and additional flanges on the side and end walls having parts overlapping ends of the corner posts for limiting the movement of the side and end walls.

10. A burial case comprising sheet-metal side and end walls, corner posts for uniting said walls, said posts having horizontally and vertically disposed engaging surfaces and vertically and horizontally disposed edge flanges on the side and end walls for coöperating with the corresponding surfaces of the end posts.

11. In a burial-case, the combination of metallic corner-posts formed with vertical grooves, sheet-metal side walls formed with flanges entering the grooves, the upper and lower edges of the walls being formed with outwardly-projecting portions bearing on the ends of the posts, and keys inserted in said grooves and locking the flanges therein.

12. In a burial-case, the combination of corner-posts formed with vertical grooves in their inner sides and with steps projecting from the end faces of the posts, the walls formed with vertical flanges locked in said grooves and at their longitudinal edges with outwardly-projecting portions bearing on the ends of the posts and abutting against said steps.

In testimony whereof, I have hereunto signed my name in the presence of two attesting witnesses, at Syracuse, in the county of Onondaga, in the State of New York, this 4th day of November, 1905.

PATRICK D. SKAHEN.

Witnesses:
S. Davis,
E. K. Seemiller.

Copies of this patent may be obtained for five cents each, by addressing the "Commissioner of Patents, Washington, D. C."